US006814400B2

(12) United States Patent
Henderson et al.

(10) Patent No.: US 6,814,400 B2
(45) Date of Patent: Nov. 9, 2004

(54) FRONT END ASSEMBLY WITH COMPONENT INTEGRATION PANEL

(75) Inventors: Jack V. Henderson, West Bloomfield, MI (US); John Patrick Schultz, St. Clair Shores, MI (US); Keijo Huotari, Fenton, MI (US)

(73) Assignee: Decoma International Inc., Concord (CA)

( * ) Notice: Subject to any disclaimer, the term of this patent is extended or adjusted under 35 U.S.C. 154(b) by 0 days.

(21) Appl. No.: 10/321,979

(22) Filed: Dec. 17, 2002

(65) Prior Publication Data

US 2003/0141745 A1 Jul. 31, 2003

Related U.S. Application Data

(60) Provisional application No. 60/341,333, filed on Dec. 17, 2001.

(51) Int. Cl.[7] .............................................. B62D 25/05
(52) U.S. Cl. .............................. 296/193.09; 296/193.1; 296/203.02; 180/68.4
(58) Field of Search ........................ 296/193.04, 193.09, 296/193.1, 203.02; 180/68.4

(56) References Cited

U.S. PATENT DOCUMENTS

| 5,123,695 | A |   | 6/1992  | Kanemitsu et al. |         |
|-----------|---|---|---------|------------------|---------|
| 5,311,963 | A | * | 5/1994  | Shigeoka et al.  | 180/274 |
| 5,358,304 | A |   | 10/1994 | Kanemitsu et al. |         |
| 5,882,064 | A |   | 3/1999  | Emmons           |         |
| 6,170,906 | B1 |   | 1/2001  | Kasuga           |         |
| 6,205,638 | B1 |   | 3/2001  | Yustick          |         |
| 6,216,810 | B1 |   | 4/2001  | Nakai et al.     |         |
| 6,227,321 | B1 |   | 5/2001  | Frascaroli et al.|         |
| 6,282,769 | B1 |   | 9/2001  | Longo et al.     |         |
| 6,357,821 | B1 | * | 3/2002  | Maj et al.       | 296/193.09 |
| 6,375,252 | B1 |   | 4/2002  | Cheron et al.    |         |
| 6,409,255 | B2 |   | 6/2002  | Tilsner et al.   |         |

FOREIGN PATENT DOCUMENTS

| AT | 1 044 866 A2 | 10/2000 |
| DE | 100 02 499 A1 | 1/2000 |
| WO | WO 99/54187 | 10/1999 |
| WO | WO 02/102646 | 12/2002 |

* cited by examiner

Primary Examiner—Patricia L. Engle
(74) Attorney, Agent, or Firm—Clark Hill PLC

(57) ABSTRACT

A front end assembly for a motor vehicle having spaced apart upper and lower side rails includes an elongated upper cross member adapted to be fixedly secured to and extend between the spaced apart upper side rails. The upper cross member has a mounting surface extending the length thereof. The front end assembly also includes an elongated lower cross member adapted be fixedly secured to and extend between the spaced apart lower side rails. The lower cross member has a mounting surface extending along the length thereof. In addition, the front end assembly includes a component integration panel having upper and lower mounting portions for complementary mating engagement with the mounting surfaces of the respective upper and lower cross members to position the component integration panel between the upper and lower side rails and provide support to the component integration panel.

11 Claims, 3 Drawing Sheets

FRONT END ASSEMBLY WITH COMPONENT INTEGRATION PANEL

CROSS-REFERENCE TO RELATED APPLICATIONS

This application claims priority to and the benefit of U.S. Provisional Patent Application Ser. No. 60/341,333, filed Dec. 17, 2001.

FIELD OF THE INVENTION

This invention relates to a front end assembly for a motor vehicle. More particularly, the invention relates to a front end assembly including upper and lower cross members for positioning a component integration panel between upper and lower side rails of a motor vehicle during the manufacture and assembly thereof.

DESCRIPTION OF THE RELATED ART

Modular assemblies generally involve assembly of components or sub-components together as one piece separately from the rest of a motor vehicle for later installation to the motor vehicle. These modular assemblies have gained acceptance due in large part to the savings in costs and time associated therewith. A front end of the motor vehicle may be assembled as a modular assembly for later integration with the motor vehicle. Such a front end module assembly may include a panel member and various components including, but not limited to, a grill, a radiator, lamp assemblies, and turn signals, secured thereto. Examples of such front end module assemblies are shown in U.S. Pat. Nos. 6,205,638 and 6,282,769.

The front end module assembly is typically attached to forward ends of spaced apart side rails of a motor vehicle frame. The side rails extend along each side of the motor vehicle and allow various components, such as fenders and doors, to be secured thereto during motor vehicle assembly. Many motor vehicles include an upper side rail and a lower side rail extending along each side.

The upper and lower side rails present, however, a problem when utilized in association with the front end module assembly. Because the upper and lower side rails are not secured or anchored to anything at the front end of the motor vehicle, the location of the upper and lower side rails can vary. This makes it difficult to consistently position and mount the front end module assembly to the upper and lower side rails.

U.S. Pat. No. 6,216,810 discloses a typical attachment of a front end module assembly to side rails of a motor vehicle. The front end module assembly includes a front end panel having various components, such as a radiator, a condenser, and a pair of left and right head lamps, secured thereto. The front end panel is disposed between left and right front side rails. A bracket secures the left front side rail to the front end panel and another bracket secures the right front side rail to the front end panel. While the brackets allow for mounting of the front end panel, they do not maintain the side rails in a constant location so that the front end panel may be positioned thereto.

Thus, there remains a need for a structural member that positions and securely mounts a front end modular assembly to upper and lower side rails during manufacturing and assembly of a motor vehicle.

SUMMARY OF THE INVENTION

The disadvantages of the related art may be overcome by providing a front end assembly including upper and lower cross members that are secured to spaced apart upper and lower side rails of a motor vehicle and that position a component integration panel between the upper and lower side rails.

According to one aspect of the invention, a front end assembly for a motor vehicle, which includes spaced apart upper and lower side rails, includes an elongated upper cross member adapted to be fixedly secured to and extend between the spaced apart upper rails. The upper cross member has a mounting surface extending the length thereof. The front end assembly also includes an elongated lower cross member adapted to be fixedly secured to and extend between the spaced apart lower side rails. The lower cross member has a mounting surface extending the length thereof. In addition, the front end assembly includes a component integration panel having upper and lower mounting portions for complementary mating engagement with the mounting surfaces of the respective upper and lower cross members to position the component integration panel between the upper and lower side rails and to provide structural support to the component integration panel.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
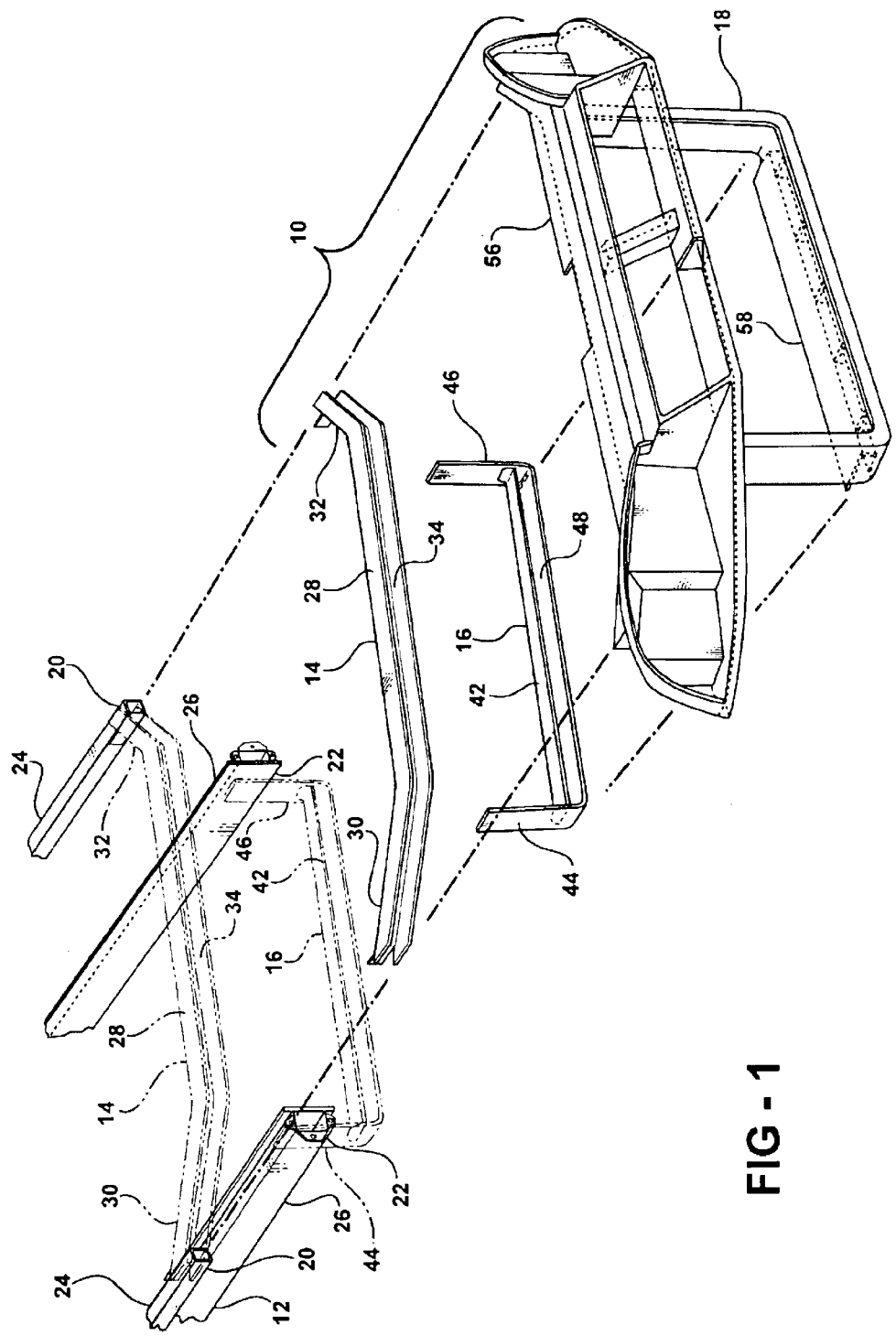
FIG. 1 is an exploded, perspective view of a front end assembly according to one embodiment of the invention.

Referring to FIG. 1, a front end assembly, generally shown at 10, for a motor vehicle 12 includes an elongated upper cross member 14, an elongated lower cross member 16, and a component integration panel 18. The front end assembly 10 is generally mounted at forward ends 20, 22 of respective spaced apart upper 24 and lower 26 side rails of the motor vehicle 12. The upper 24 and lower 26 side rails extend longitudinally along each side of the motor vehicle 12 and allow attachment of various components, such as fenders, door jamb elements, and the like, thereto.

The upper cross member 14 is adapted to be fixedly secured to and extend between the spaced apart upper side rails 24. The upper cross member 14 includes a center segment 28 and receiving ends 30, 32 extending out therefrom. The center segment 28 and the receiving ends 30, 32 define a length of the upper cross member 14. The receiving ends 30, 32 are fixedly secured to the upper spaced side rails 24 at the forward ends 20 thereof. In the embodiment shown, the receiving ends 30, 32 extend out at an angle from the center segment 28. It is appreciated that the center segment 28 and the receiving ends 30, 32 may extend in a straight line.

Figure 2:
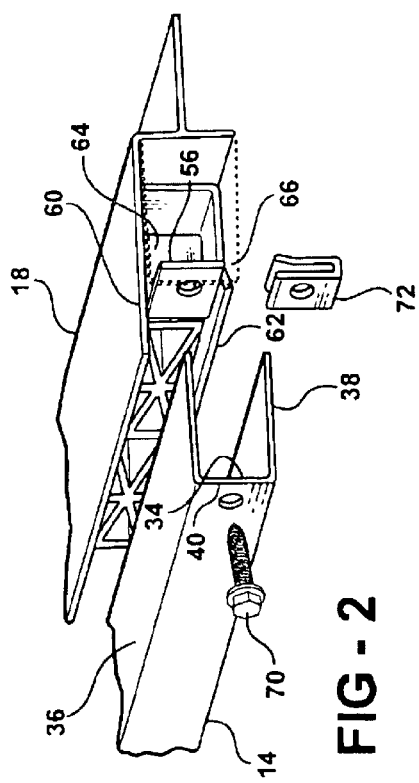
FIG. 2 is an exploded, perspective view of an upper cross member and a component integration panel of the invention.

The upper cross member 14 includes a mounting surface 34 extending along the length thereof. When the upper cross member 14 is secured to the upper side rails 24, the mounting surface 34 faces outwardly away from the rest of the motor vehicle 12 so as to be available for engagement with the component integration panel 18. The mounting surface 34 has a pre-determined cross-sectional configuration that is complementary to the component integration panel 18 to allow mating engagement between the upper cross member 14 and the component integration panel 18. It is contemplated that the cross-sectional configuration of the mounting surface 34 may be formed in any of a multitude of configurations suitable for mating engagement with a complementary member. In a preferred embodiment, the mounting surface 34 is defined by top 36 and bottom 38 sides and a rear wall 40 extending therebetween so that the upper cross member 14 has a C-shaped cross sectional configuration, as shown in FIG. 2.

Referring back to FIG. 1, the lower cross member 16 is adapted to be fixedly secured to and extend between the spaced apart lower side rails 26. The lower cross member 16 includes a mounting segment 42 and receiving ends 44, 46 extending out therefrom. The mounting segment 42 defines a length of the lower cross member 16. The receiving ends 44, 46 are fixedly secured to the lower side rails 26 at the forward ends 22 thereof. In the embodiment shown, the receiving ends 44, 46 are perpendicular to the mounting segment 42 and extend upwardly therefrom.

Figure 6:
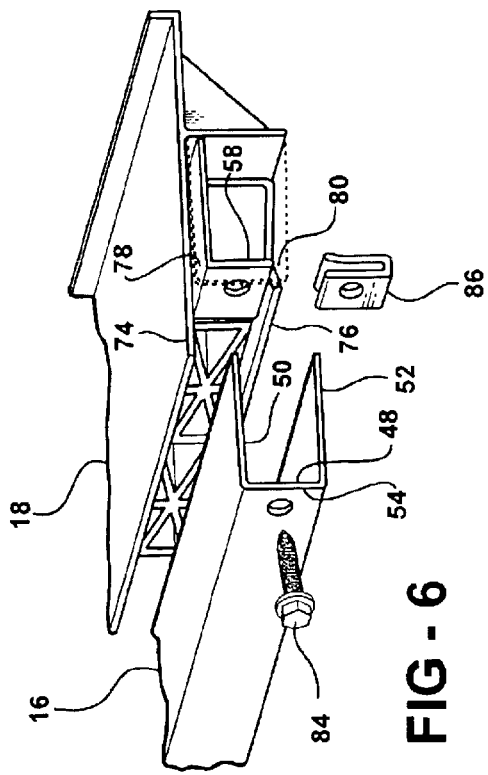
FIG. 6 is an exploded, perspective view of a lower cross member and the component integration panel of the invention.

The lower cross member 16 includes a mounting surface 48 extending along the length thereof, that is, all along the mounting segment 42. When the lower cross member 16 is fixedly secured to the lower side rails 26, the mounting surface 48 faces outwardly away from the rest of the motor vehicle 12 so as to be available for mounting with the component integration panel 18. The mounting surface 48 of the lower cross member 16 has a predetermined cross-sectional configuration that is complementary to the component integration panel 18 to allow mating engagement between the lower cross member 16 and the component integration panel 18. It is contemplated that the cross-sectional configuration of the mounting surface 48 may be formed in any of a multitude of configurations suitable for mating engagement with a complementary member. In a preferred embodiment, the mounting surface 48 is defined by top 50 and bottom 52 sides and a rear wall 54 extending therebetween so that the lower cross member 16 has a C-shaped cross-sectional configuration, as shown in FIG. 6.

Referring once again to FIG. 1, the component integration panel 18 is mounted to the upper 14 and lower 16 cross members. The component integration panel 18 also allows various components to be mounted thereto prior to and/or after installation to upper 14 and lower 16 cross members. These components include, but are not limited to, a grill, a radiator, a bumper, a front fender fascia.

Figure 3:
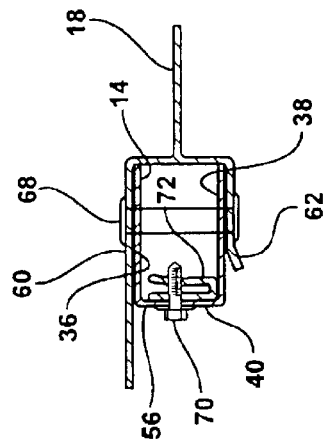
FIG. 3 is a cross-sectional side view taken along line 3—3 in FIG. 2.

The component integration panel 18 includes an upper mounting portion 56 and a lower mounting portion 58. Referring to FIGS. 2 and 3, the upper mounting portion 56 matingly engages the mounting surface 34 to secure the component integration panel 18 to the upper cross member 14. The upper mounting portion 56 has a cross-sectional configuration that is complementary to that of the mounting surface 34. In the embodiment shown, the component integration panel 18 includes guide flanges 60, 62 extending above and below the upper mounting portion 56. A mounting gap 64 extends between the upper mounting portion 56 and the guide flange 60 while another mounting gap 66 extends between the upper mounting portion 56 and the guide flange 62. When the component integration panel 18 matingly engages the upper cross member 14, the rear wall 40 of the upper cross member 14 will abut the upper mounting portion 56, and the top 36 and bottom 38 sides of the upper cross member 14 will extend into the mounting gaps 64, 66. The mating engagement of the upper mounting portion 56 and the mounting surface 34 results in a closed box configuration that provides strength to the front end assembly 10.

One method of securing the component integration panel 18 to the upper cross member 14 involves using a rivet 68 and a bolt 70. Referring to FIG. 2, the rivet 68 extends through the upper mounting portion 56, the guide flanges 60, 62, and the top 36 and bottom 38 sides of the upper cross member 14. The bolt 70 is inserted through the rear wall 40 of the upper cross member 14, a U-nut 72 disposed adjacent the upper mounting portion 56, and the rear wall 40. The rivet 68 and the bolt 70 maintain the closed box configuration between the upper mounting portion 56 and the mounting surface 34.

Figure 5:
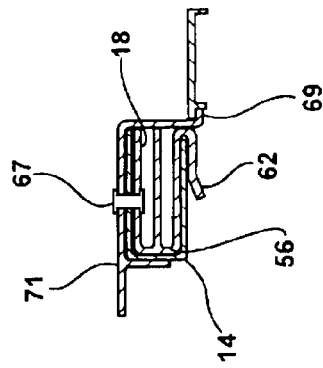
FIG. 5 is a cross-sectional side view taken along a section similar to line 3—3 in FIG. 2 including the upper cover.
Figure 4:
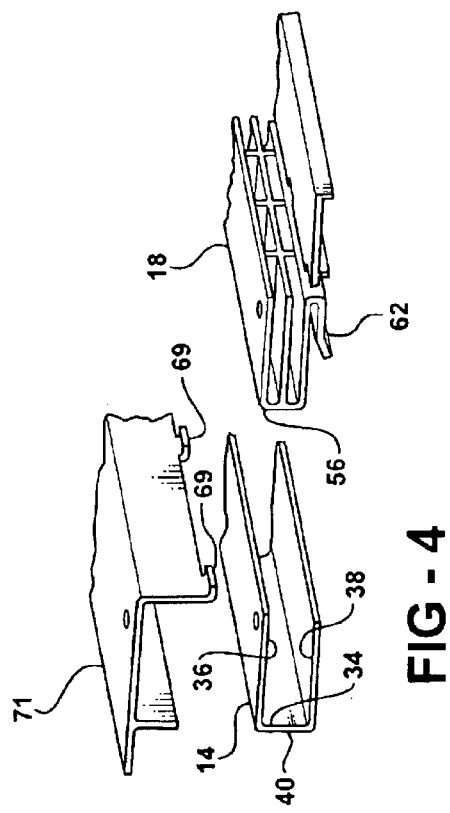
FIG. 4 is an exploded, perspective view of an upper cover for the front end assembly.

Referring to FIGS. 4 and 5, another method for securing the component integration panel 18 to the upper cross member 14 utilizes an upper cover 71. The upper cover 71 is placed over the upper mounting portion 56 of the component integration panel 18 and the upper cross member 14 after the upper mounting portion 56 is inserted into the mounting surface 34 of the upper cross member 14. The upper cover 71 includes locking tabs 69, which lockingly engage the upper mounting portion 56. A rivet 67 (shown in FIG. 5) extends through the upper cover 71, a portion of the upper mounting portion 56, and the top side 36 of the upper cross member 14 to further secure the component integration panel 18 to the upper cross member 14. In addition, an adhesive may be applied along the inside of the upper cover 71, and along the top 36 and bottom 38 sides and the rear wall 40 of the upper cross member 14.

Referring to FIGS. 6 through 9, the lower mounting portion 58 matingly engages the mounting surface 48 to secure the component integration panel 18 to the lower cross member 16. The lower mounting portion 58 has a cross-sectional configuration that is complementary to that of the mounting surface 48. In the embodiment shown, the lower mounting portion 58 is surrounded by guide flanges 74, 76 extending thereabove and therebelow. A mounting gap 78 extends between the lower mounting portion 56 and the guide flange 74 while another mounting gap 80 extends between the lower mounting portion 58 and the guide flange 76. When the component integration panel 18 engages the lower cross member 16, the rear wall 54 abuts the lower mounting portion 58 and the top 50 and bottom 52 sides extend into the mounting gaps 78, 80. The mating engagement of the lower mounting portion 58 and the mounting surface 48 results in a closed box configuration that provides strength to the front end assembly 10.

Figure 7:
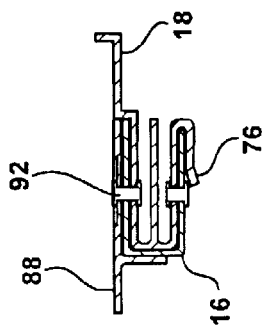
FIG. 7 is a cross-sectional side view taken along line 7—7 in FIG. 6.

Referring to FIGS. 6 and 7, one method of securing the component integration panel 18 to the lower cross member 16 involves bonding and riveting the lower mounting portion 58 to the mounting surface 48. A rivet 82 extends through the lower mounting portion 58, the guide flanges 74, 76, and the top 50 and bottom 52 sides of the lower cross member 16. A bolt 84 is inserted through the rear wall 54 of the lower cross member 16, through a U-nut 86 disposed adjacent the lower mounting portion 58, and into the lower mounting portion 58.

Figure 9:
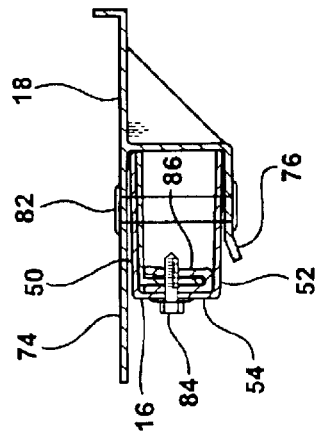
FIG. 9 is a cross-sectional side view taken along a section similar to line 7—7 in FIG. 6 including the lower cover.
Figure 8:
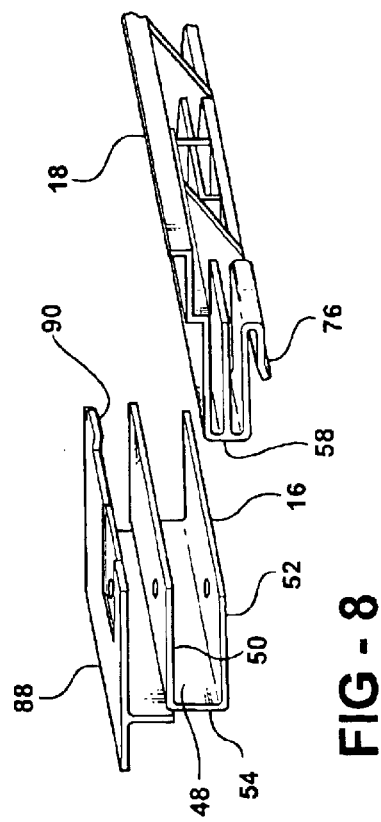
FIG. 8 is an exploded, perspective view of a lower cover for the front end assembly.

Referring to FIGS. 8 and 9, another method for securing the component integration panel 18 to the lower cross member 16 utilizes a lower cover 88. The lower cover 88 is positioned over the lower mounting portion 58 of the component integration panel 18 and the mounting surface 48 of the lower cross member 16 after the lower mounting portion 58 engages the mounting surface 48. The lower cover 88 includes locking tabs 90, which lockingly engage the lower mounting portion 58 to further secure the component integration panel 18 and the lower cross member 16. Rivet 92 extends through the lower cover 88, a portion of the lower mounting surface 58, and the top side 50 of the lower cross member 16 to further secure the component integration panel 18 to the lower cross member 16. In addition, an adhesive may be applied along the inside of the lower cover 88, and along the top 50 and bottom 52 sides and the rear wall 54 of the lower cross member 16.

During manufacture of the motor vehicle 12, the upper 14 and lower 16 cross members are first fixedly secured to the spaced apart upper 24 and lower 26 side rails. The mounting surfaces 48, 58 of the respective upper 14 and lower 16 cross members are thus available for complementary mating engagement with the upper 56 and lower 58 mounting portions of the component integration panel 18. The component integration panel 18 is then secured to the upper 16 and lower 18 cross members. The upper 14 and lower 16 cross members allow for consistent positioning of the component integration panel 18 between the upper 24 and lower 26 side rails during manufacture of the motor vehicle 12. In addition, the upper 14 and lower 16 cross members provide structural support to the component integration panel 18.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A front end assembly for a motor vehicle having spaced apart upper and lower side rails, said front end assembly comprising:

an elongated upper cross member defining a first length and adapted to be fixedly secured to and extend between the spaced apart upper side rails, said upper cross member having a mounting surface extending the along said first length thereof;

an elongated lower cross member defining a second length and adapted to be fixedly secured to and extend between the spaced apart lower side rails, said lower cross member having a mounting surface extending along said second length thereof; and a component integration panel having elongated upper and lower mounting portions for complementary mating engagement with said mounting surfaces all along said first and second lengths of said respective upper and lower cross members to position said component integration panel between the upper and lower side rails and provide structural support to said component integration panel.

2. A front end assembly as set forth in claim 1 wherein said mounting surface of said upper cross member has a predetermined cross-sectional configuration and said upper mounting portion of said component integration panel has a complementary cross-sectional configuration for mating engagement with said cross-sectional configuration of said upper cross member.

3. A front end assembly as set forth in claim 2 wherein said mounting surface of said lower cross member has a predetermined cross-sectional configuration and said lower mounting portion of said component integration panel has a complementary cross-sectional configuration for mating engagement with said cross-sectional configuration of said lower cross member.

4. A front end assembly as set forth in claim 3 wherein said mounting surface of said upper cross member includes top and bottom sides and an interconnecting rear wall defining a C-shaped cross-sectional configuration all along said length of said upper cross member.

5. A front end assembly as set forth in claim 4 wherein said mounting surface of said lower cross member includes top and bottom sides and an interconnecting rear wall defining a C-shaped cross-sectional configuration all along said length of said lower cross member.

6. A front end assembly as set forth in claim 5 wherein said upper mounting portion of said component integration panel is fixedly secured to said mounting surface of said upper cross member.

7. A front end assembly as set forth in claim 6 wherein said lower mounting portion of said component integration panel is fixedly secured to said mounting surface of said lower cross member.

8. A front end assembly as set forth in claim 7 including an upper cover extending over a portion of said upper mounting portion of said component integration panel and said mounting surface of said upper cross member to secure said component integration panel to said upper cross member.

9. A front end assembly as set forth in claim 8 including a lower cover extending over a portion of said lower mounting portion of said component integration panel and said mounting surface of said lower cross member to secure said component integration panel to said lower cross member.

10. A front end assembly as set forth in claim 9 wherein said upper cross member includes receiving ends fixedly secured to the upper side rails.

11. A front end assembly as set forth in claim 10 wherein said lower cross member includes receiving ends fixedly secured to the lower side rails.

* * * * *